(12) United States Patent
Biller et al.

(10) Patent No.: US 11,599,442 B1
(45) Date of Patent: Mar. 7, 2023

(54) DETECTING ABNORMAL DATABASE ACTIVITY

(71) Applicant: International Business Machines Corporation, Armonk, NY (US)

(72) Inventors: Ofer Haim Biller, Midreshet Ben Gurion (IL); Oded Sofer, Midreshet Ben Gurion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/536,196

(22) Filed: Nov. 29, 2021

(51) Int. Cl.
  *G06F 11/34* (2006.01)
  *G06F 11/30* (2006.01)
  *G06F 16/23* (2019.01)

(52) U.S. Cl.
  CPC ...... *G06F 11/3495* (2013.01); *G06F 11/3024* (2013.01); *G06F 16/2365* (2019.01)

(58) Field of Classification Search
  None
  See application file for complete search history.

(56) References Cited

U.S. PATENT DOCUMENTS

| | | | |
|---|---|---|---|
| 7,020,791 B1 | 3/2006 | Aweya et al. | |
| 2003/0079160 A1* | 4/2003 | McGee | G06F 17/18 714/39 |
| 2008/0167837 A1* | 7/2008 | Basak | G06K 9/00503 702/179 |
| 2013/0080375 A1* | 3/2013 | Viswanathan | G06F 11/076 706/46 |
| 2014/0012901 A1 | 1/2014 | Ruhl et al. | |
| 2014/0298098 A1* | 10/2014 | Poghosyan | G06F 11/0751 714/37 |
| 2016/0147583 A1 | 5/2016 | Ben Simhon et al. | |
| 2016/0323157 A1* | 11/2016 | Marvasti | G06F 11/3006 |
| 2019/0370610 A1* | 12/2019 | Batoukov | G06K 9/00523 |
| 2020/0117177 A1* | 4/2020 | Cantrell | G06N 5/04 |
| 2020/0134061 A1 | 4/2020 | Gaber et al. | |

(Continued)

OTHER PUBLICATIONS

Fotios Pelropoulos, et al., "Fast and frugal time series forecasting", Working Paper, https://papers.ssrn.com/sol3/papers.cfm?abstract_id=3792565, Feb. 24, 2021, 27 pages.

(Continued)

*Primary Examiner* — Irene Baker
(74) *Attorney, Agent, or Firm* — Edell, Shapiro & Finnan, LLC

(57) ABSTRACT

In a present invention embodiment, time series data is received including information pertaining to a corresponding attribute of monitored activity on a processing device. An upper bound of the time series data is determined based on a weighted combination of a prior upper bound and a current value derived from the time series data. Greater weight is provided to greater values in the time series data based on an exponent applied to the prior upper bound and the current value and an effect of older values in the time series data decays over time based on a smoothing factor applied to exponential values of the prior upper bound and the current value. The upper bound is applied to a profile of an entity, and abnormal activity on the processing device is detected based on a comparison of the upper bound to a corresponding bound of the profile.

18 Claims, 6 Drawing Sheets

(56) References Cited

U.S. PATENT DOCUMENTS

| | | | |
|---|---|---|---|
| 2020/0242483 A1 | 7/2020 | Shashikant Rao et al. | |
| 2021/0035011 A1* | 2/2021 | Arnold | G06N 20/00 |
| 2021/0150384 A1 | 5/2021 | Dasgupta et al. | |
| 2021/0374027 A1* | 12/2021 | Joglekar | G06F 11/3072 |

OTHER PUBLICATIONS

U.S. Appl. No. 17/222,010, filed Apr. 5, 2021.
International Search Report and Written Opinion in corresponding International Application No. PCT/IB2022/058306, dated Nov. 28, 2022, 6 pages.
Gao, Jianliang, et al., "Weighted-Median Based Distributed Fault Detection for Wireless Sensor Networks", Journal of Software, vol. 18, No. 5, May 31, 2007, 10 pages.

* cited by examiner

DETECTING ABNORMAL DATABASE ACTIVITY

BACKGROUND

1. Technical Field

Present invention embodiments relate to computer or other device security, and more specifically, to detecting abnormal activity on a database or other processing device based on determining (or approximating) upper and/or lower bounds of time series activity data in a data stream real-time environment.

2. Discussion of the Related Art

Abnormal database activity may be detected from analysis of streaming data pertaining to activity information. This detection typically requires maintaining maximal and minimal values of time series data for the analysis. However, a data stream real-time environment contains very large volumes of data, typically on the order of millions of data items per second. Accordingly, a large statistical model would be required, especially for real-time analysis and when a training period for the statistical model is over a long time interval for data. Further, there are many vectors to analyze while the analysis is required to be performed in a short period of time.

Although global maximum and/or minimum values may be saved for continuous streaming time series values, the global maximum and/or minimum values may be insufficient since the older values become less relevant over time. A common approach for this insufficiency is to retain separate maximal and/or minimal values for sub-portions of a time range in the data stream (e.g., maximum and/or minimum values for each day, etc.), and analyze the retained maximal and/or minimal values to maintain maximum and/or minimum values of the last required time period. However, this approach is cumbersome and consumes significant storage.

SUMMARY

According to one embodiment of the present invention, a system detects abnormal activity on a processing device and comprises at least one processor. The system receives time series data including information pertaining to a corresponding attribute of monitored activity on the processing device. An upper bound of the time series data is determined based on a weighted combination of a prior upper bound and a current value derived from the time series data. Greater weight is provided to greater values in the time series data based on an exponent applied to the prior upper bound and the current value and an effect of older values in the time series data decays over time based on a smoothing factor applied to exponential values of the prior upper bound and the current value that are derived from applying the exponent. The upper bound is applied to a profile of an entity associated with the monitored activity. The profile includes bounds for attributes of activities of the entity indicating valid behavior and the upper bound is compared to a corresponding bound of the profile. Abnormal activity on the processing device is detected based on the comparison of the upper bound to the corresponding bound of the profile. Embodiments of the present invention further include a method and computer program product for detecting abnormal activity on a processing device in substantially the same manner described above.

BRIEF DESCRIPTION OF THE DRAWINGS

Generally, like reference numerals in the various figures are utilized to designate like components.

DETAILED DESCRIPTION

Abnormal database activity may be detected from analysis of streaming data pertaining to activity information. This detection typically requires maintaining maximal and minimal values of time series data for the analysis. Although global maximum and/or minimum values may be saved for continuous streaming time series values, the global maximum and/or minimum values may be insufficient since the older values become less relevant over time. A common approach for this insufficiency is to retain separate maximal and/or minimal values for sub-portions of a time range in the data stream (e.g., maximum and/or minimum values for each day, etc.), and analyze the retained maximal and/or minimal values to maintain maximum and/or minimum values of the last required time period. However, this approach is cumbersome and consumes significant storage.

Accordingly, a present invention embodiment detects abnormal activity on a database or other processing device based on approximating upper and/or lower bounds of time series data containing activity information in a data stream real-time environment with very large volumes of data per time interval (e.g., on the order of one or more millions of data items per second, etc.). A present invention embodiment maintains these bounds with minimal consumption of computation time and memory (e.g., extremely low storage and computation requirements), and may identify abnormal activity or security issues within real-time data streams containing activity information of the database or other processing device.

A present invention embodiment employs exponential smoothing and an exponential generalized mean to maintain one or more bounds of time series data. This minimizes storage since the number of values maintained for the determination is minimal, and provides greater weight to recent values while gradually removing effects of older values. In other words, values of recent events are remembered, but older events in an event history are gradually forgotten. The minimization of storage further minimizes run time for updating training data of a statistical model (e.g., for analytics, etc.) and performing real-time analysis.

In addition, the streaming data containing activity information of the database or other processing device may be captured for only a certain time window (e.g., an hour, etc.). When several time windows need to be analyzed, the captured data of the several time windows needs to be saved. However, the amount of the captured data to be saved may overwhelm storage capacity or limit analysis to only a portion of the captured data. A present invention embodiment enables the bounds to be determined as the data is streamed in real-time (e.g., without storing significant amounts of the captured data). This improves processing speed, and enables analysis of additional behaviors (e.g., of a greater number of users and/or applications, etc.).

Figure 1:
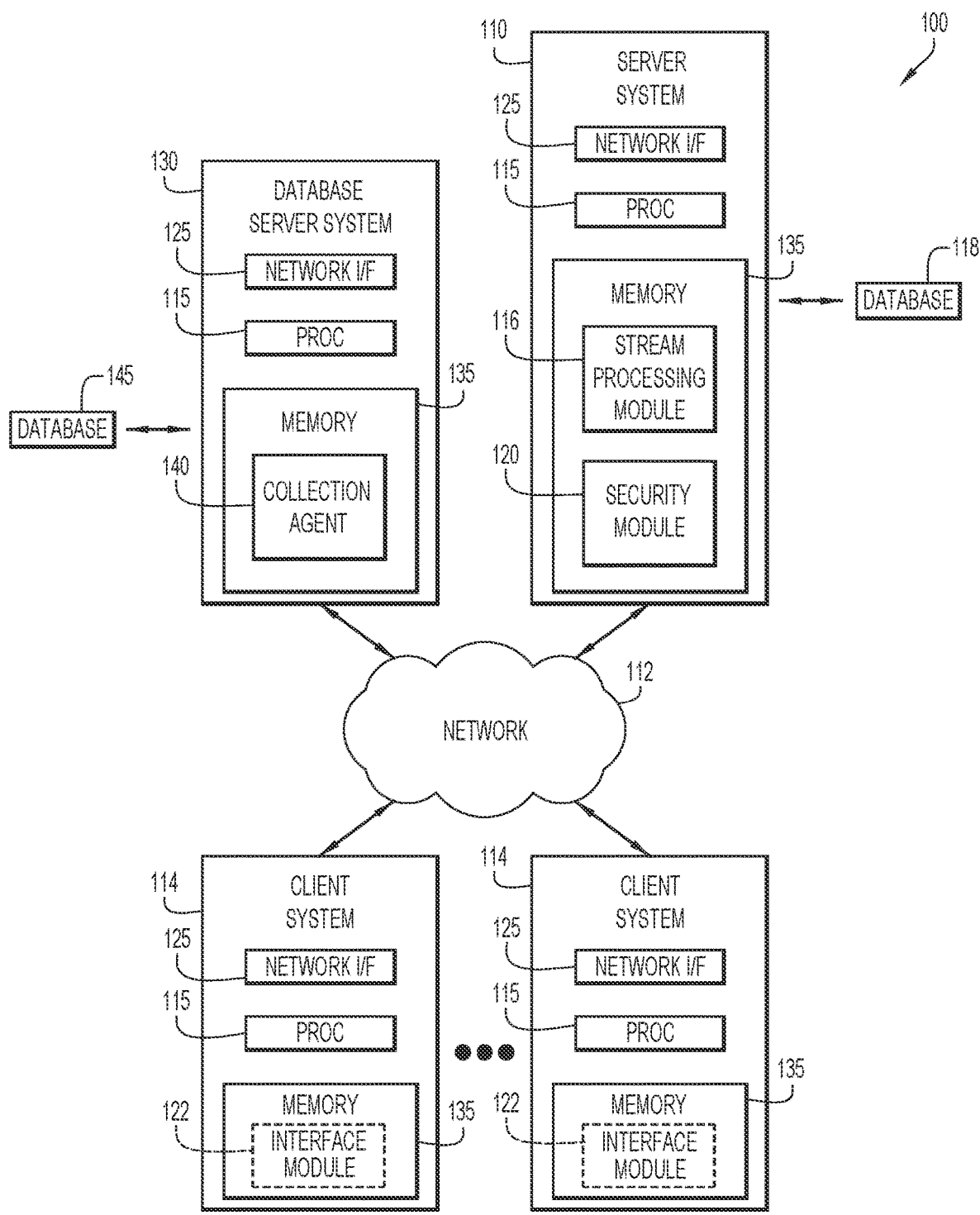
FIG. 1 is a diagrammatic illustration of an example computing environment according to an embodiment of the present invention.

An example environment for use with present invention embodiments is illustrated in FIG. 1. Specifically, environment 100 includes one or more server systems 110, one or more client or end-user systems 114, and one or more database server systems 130. Server systems 110, client systems 114, and database server systems 130 may be remote from each other and communicate over a network 112. The network may be implemented by any number of any suitable communications media (e.g., wide area network (WAN), local area network (LAN), Internet, Intranet, etc.). Alternatively, server systems 110, client systems 114, and database server systems 130 may be local to each other, and communicate via any appropriate local communication medium (e.g., local area network (LAN), hardwire, wireless link, Intranet, etc.).

Client systems 114 enable users to submit requests for data to database server systems 130 and to receive notifications from server systems 110 pertaining to security issues. The client systems include an interface module or browser 122 to present a graphical user (e.g., GUI, etc.) or other interface (e.g., command line prompts, menu screens, etc.) to solicit information from users pertaining to desired data requests, and may provide reports including analysis results (e.g., security notifications, abnormal activity, retrieved data, etc.).

Database server systems 130 include a collection agent 140 to monitor activities of the database server systems (e.g., data accesses, user or application requests, program code, etc.). A database system 145 may store various data requested by users or applications. The database system may be implemented by any conventional or other database or storage unit, may be local to or remote from server systems 110, client systems 114, and database server systems 130, and may communicate via any appropriate communication medium (e.g., local area network (LAN), wide area network (WAN), Internet, hardwire, wireless link, Intranet, etc.). Although a present invention embodiment is described with respect to database server systems, the present invention embodiment may be applied to other processing devices (e.g., application or other servers, end-user/client systems, etc.) to detect abnormal activity on the other processing devices in substantially the same manner described below.

Server systems 110 include a stream processing module 116 and a security module 120. Stream processing module 116 receives and processes the streaming event data from collection agent 140 of a database server system 130. The stream processing module may convert the streaming event data to time series data (e.g., representing activity load (or density), etc.) and approximate bounds of the time series data over time as described below. Security module 120 uses the approximated bounds to identify abnormal behavior or other security anomalies in monitored activity of the database server system. A database system 118 may store various information for the security analysis (e.g., entity profiles, approximated bounds, collected data, streaming activity data, smoothed activity data, etc.). Database system 118 may be implemented by any conventional or other database or storage unit, may be local to or remote from server systems 110, client systems 114, and database server systems 130, and may communicate via any appropriate communication medium (e.g., local area network (LAN), wide area network (WAN), Internet, hardwire, wireless link, Intranet, etc.).

Server systems 110, client systems 114, and database server systems 130 may be implemented by any conventional or other computer systems preferably equipped with a display or monitor, a base (e.g., including at least one hardware processor 115 (e.g., microprocessor, controller, central processing unit (CPU), etc.), one or more memories 135 and/or internal or external network interfaces or communications devices 125 (e.g., modem, network cards, etc.)), optional input devices (e.g., a keyboard, mouse or other input device), and any commercially available and custom software (e.g., commercially available or custom server/communications software; commercially available or custom browser software; stream processing module 116, security module 120, interface module 122, and collection agent 140 of present invention embodiments; etc.).

The modules of present invention embodiments (e.g., stream processing module 116, security module 120, interface module 122, collection agent 140, etc.) may include one or more modules or units to perform the various functions of present invention embodiments described below. The various modules (e.g., stream processing module 116, security module 120, interface module 122, collection agent 140, etc.) may be implemented by any combination of any quantity of software and/or hardware modules or units, and may reside within memory 135 of the server, database server, and/or client systems for execution by a corresponding processor 115.

Figure 2:
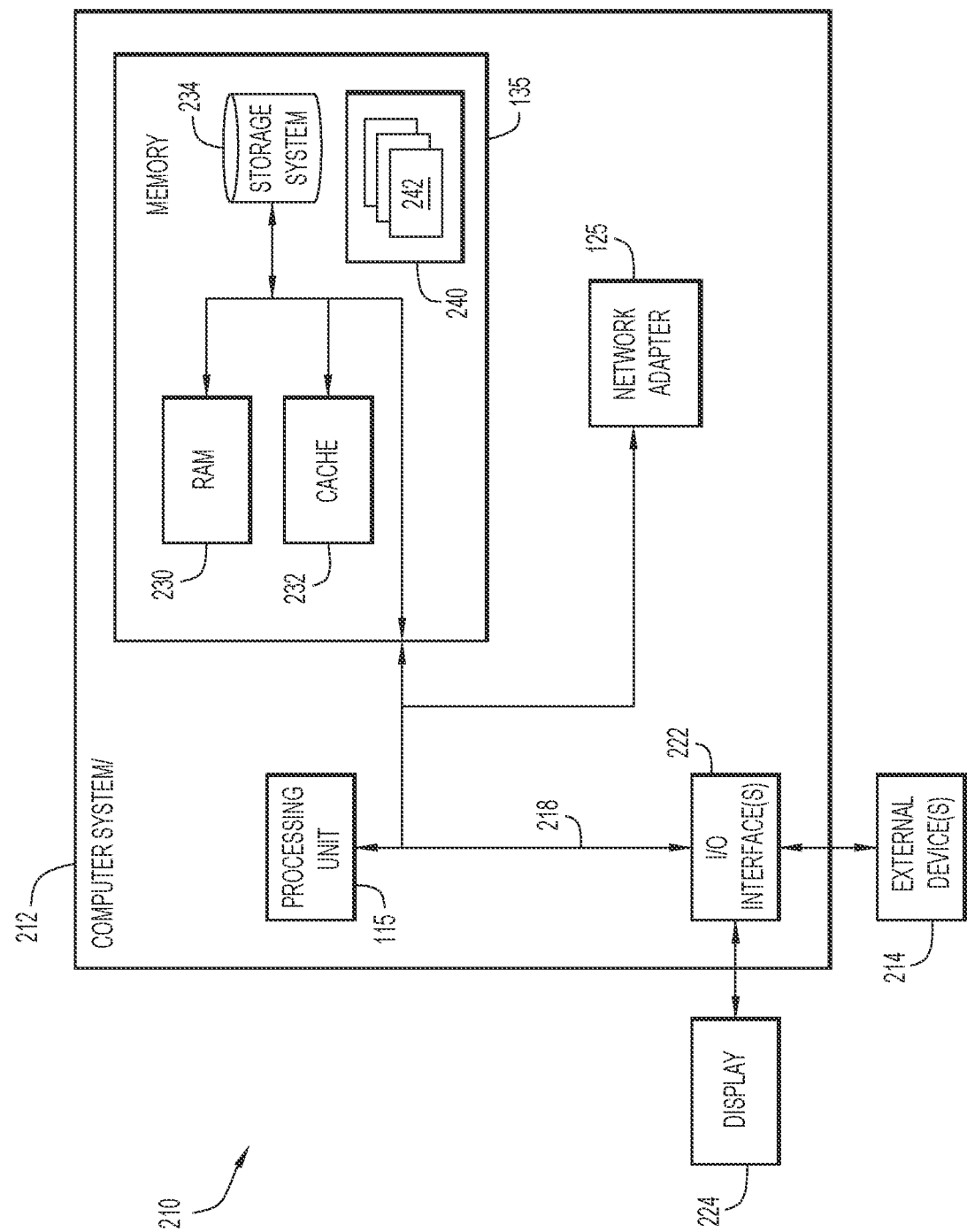
FIG. 2 is a block diagram of an example computing device according to an embodiment of the present invention.

Referring now to FIG. 2, a schematic of an example of a computing device 210 of computing environment 100 (e.g., implementing server system 110, client system 114, database server systems 130, and/or other processing devices being monitored) is shown. The computing device is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a general-purpose computing device. The components of computer system 212 may include, but are not limited to, one or more processors or processing units 115, a system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one) of program modules that are configured to carry out the functions of embodiments of the invention.

Program/utility 240, having a set (at least one) of program modules 242 (e.g., stream processing module 116, security module 120, interface module 122, collection agent 140, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

The various applications of server systems 110 (and database server systems 130) may be provided in a cloud environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multitenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
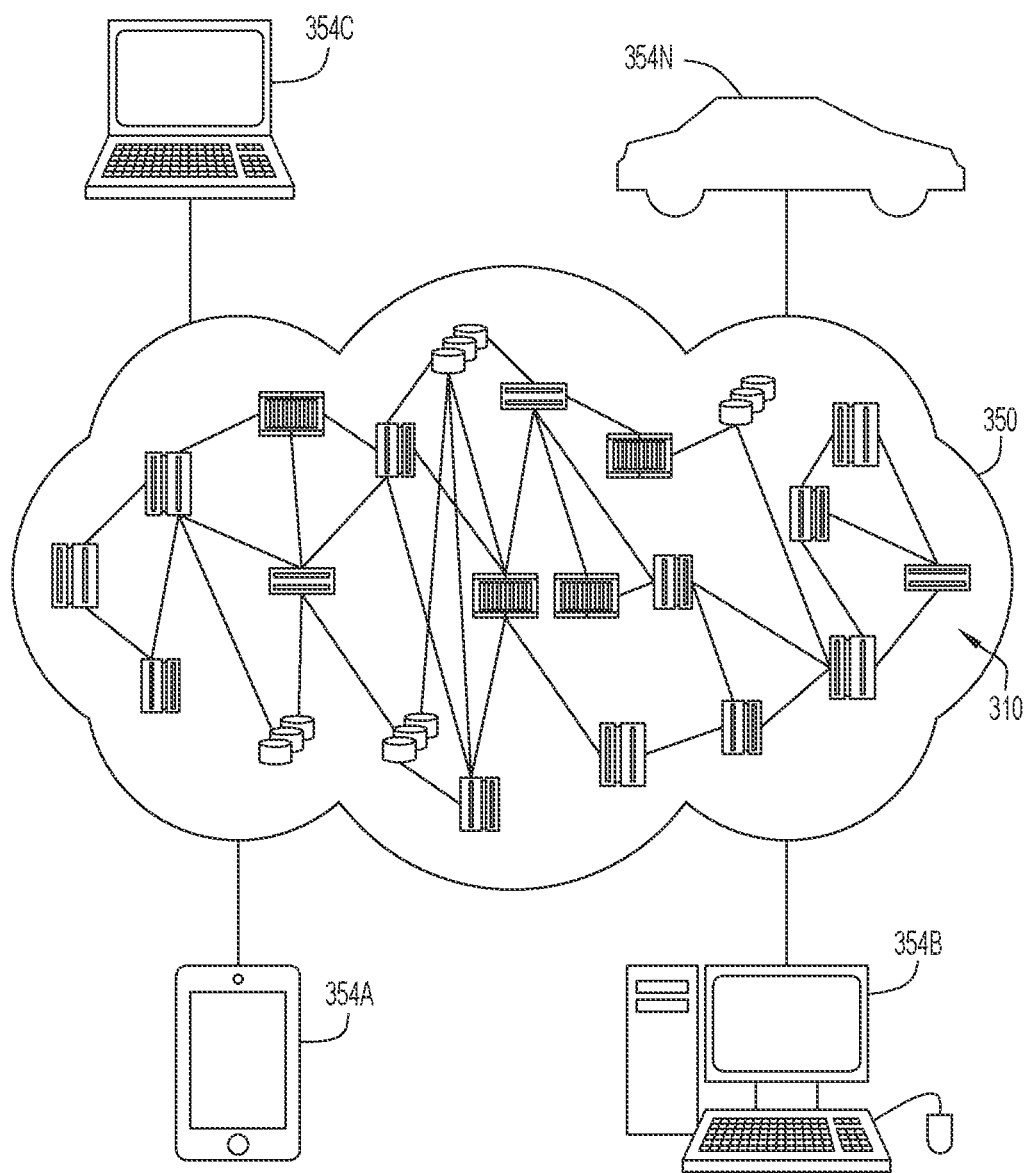
FIG. 3 is a diagrammatic illustration of an example cloud computing environment according to an embodiment of the present invention.

Referring now to FIG. 3, illustrative cloud computing environment 350 is depicted. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A—354N shown in FIG. 3 are intended to be illustrative only and that computing nodes 310 and cloud computing environment 350 can communicate with any type of computerized device over any type of network and/or network addressable connection (e.g., using a web browser).

Figure 4:
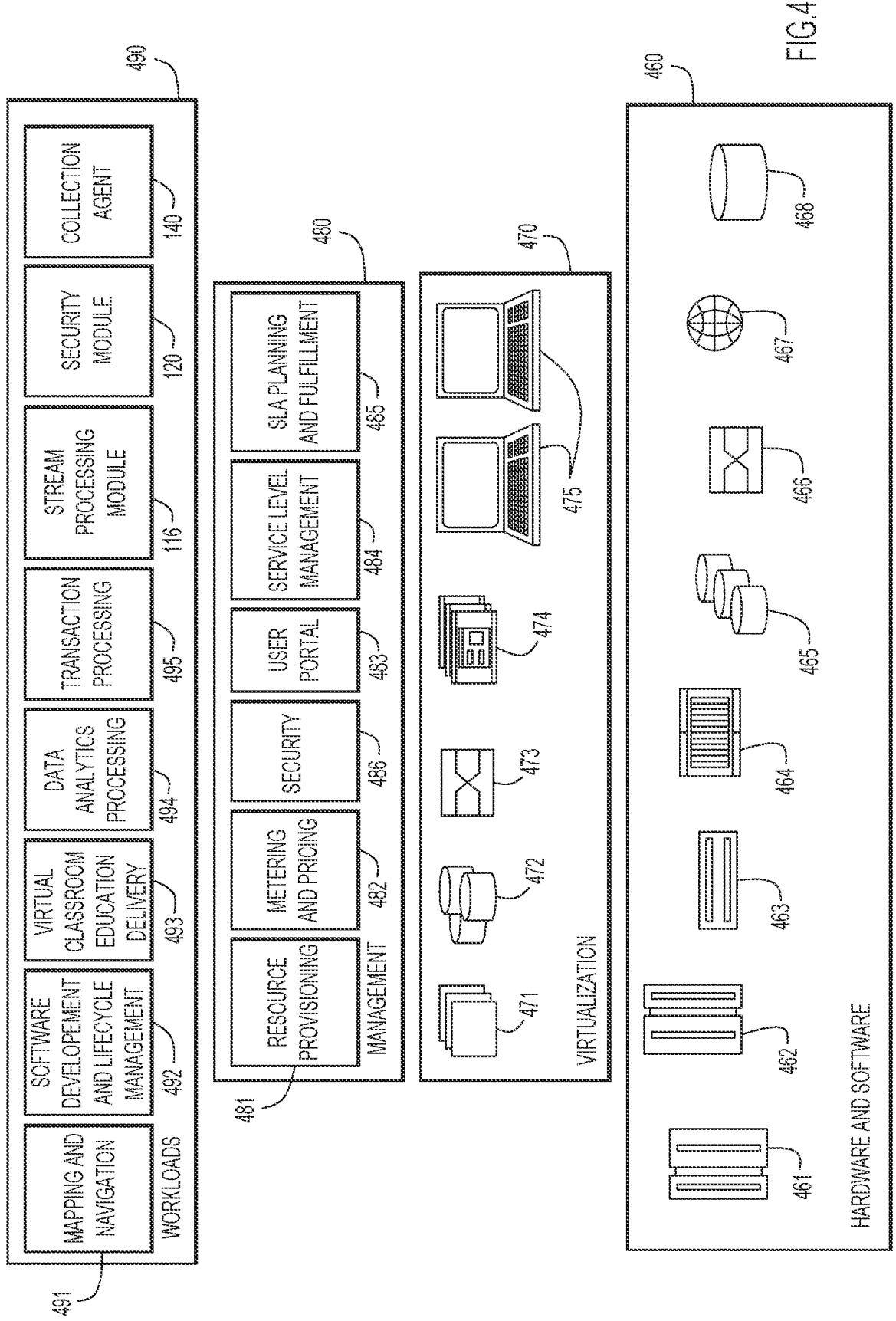
FIG. 4 is a diagrammatic illustration of abstraction model layers according to an embodiment of the present invention.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example embodiment, management layer 480 may provide some or all of the functions for server system 110 (and/or for database server system 130) described herein. Resource provisioning 481 provides dynamic procurement of computing resources and other resources that are utilized to perform tasks within the cloud computing environment. Metering and pricing 482 provides cost tracking as resources are utilized within the cloud computing environment, and billing or invoicing for consumption of these resources. In one example, these resources may include application software licenses. Security 486 provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provides pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and stream processing module 116, security module 120, and collection agent 140 for monitoring database activity as described herein.

An example of a computing node or device of cloud environment 350 (e.g., cloud computing node 310, etc.) may be computing device 210 described above for FIG. 2.

A present invention embodiment determines or approximates upper and/or lower bounds for time series data in a data stream real-time environment with very large volumes of data per time interval (e.g., on the order of one or more millions of data items per second corresponding to activity, etc.) in order to detect abnormal activity on a database or other processing device. These bounds are maintained with minimal consumption of computation time and memory (e.g., extremely low storage and computation requirements). The upper bound corresponds to a maximal value of the data stream (or time series data), and may be an estimated or approximated maximum value of the data stream (or time series data) that can be less than, equal to, or greater than an actual maximum value of the data stream (or time series data). Similarly, the lower bound corresponds to a minimal value of the data stream (or time series data), and may be an estimated or approximated minimum value of the data stream (or time series data) that can be less than, equal to, or greater than an actual minimum value of the data stream (or time series data).

Various techniques may be used to evaluate and predict time series values. For example, a technique may maintain a mean and standard deviation of time series data while applying a smoothing exponential approach. For example, a mean, E(n), for time series data applying a smoothing exponential approach may be expressed as:

$$E(n)=(1-\beta)*E(n-1)+\beta*C(n); \qquad \text{Equation 1}$$

where β is a smoothing factor (e.g., 0<β<1), n is a current time, and C(n) is time series data. The weight for recent values and historical values is adjusted using different values of β. For example, greater values of β enable recent values to have greater weights and provide for a shorter term memory for older values, while lesser values of β enable recent values to have lesser weights and provide for a longer term memory for older values.

A standard deviation, Std(n), for time series data applying exponential smoothing may be expressed as:

$$Std(n)=\sqrt{\Delta E^2(n)}; \qquad \text{and Equation 2}$$

$$\Delta E^2(n)=(1-\beta)*\Delta E^2(n-1)+\beta*(E(n)-C(n))^2; \qquad \text{Equation 3}$$

where β is a smoothing factor (e.g., 0<β<1), n is a current time, E(n) is the mean described above for Equation 1, and C(n) is time series data.

Although these expressions provide mean and standard deviation approximations for time series data, maximal and minimal values of the time series data is extremely useful for identifying abnormal behaviors in activity on a database or other processing device. Although global maximum and/or minimum values may be saved for continuous streaming time series values, the global maximum and/or minimum values may be insufficient since the older values become less relevant over time.

A common approach for this insufficiency is to retain separate maximal and/or minimal values for sub-portions of a time range (e.g., maximum and/or minimum value for each day, etc.), and analyze the retained maximal and/or minimal values to maintain maximum and/or minimum values of a last required time period. However, this approach is cumbersome and consumes significant storage.

Accordingly, present invention embodiments employ exponential smoothing and an exponential generalized mean to maintain upper and/or lower bounds of time series data. The exponential smoothing applies decreasing weights to prior time periods to phase out older data that becomes less relevant for determining the bounds. Thus, recent time periods have greater weight and more influence on the determination, while older time periods have lower influence that decreases over time.

Figure 5:
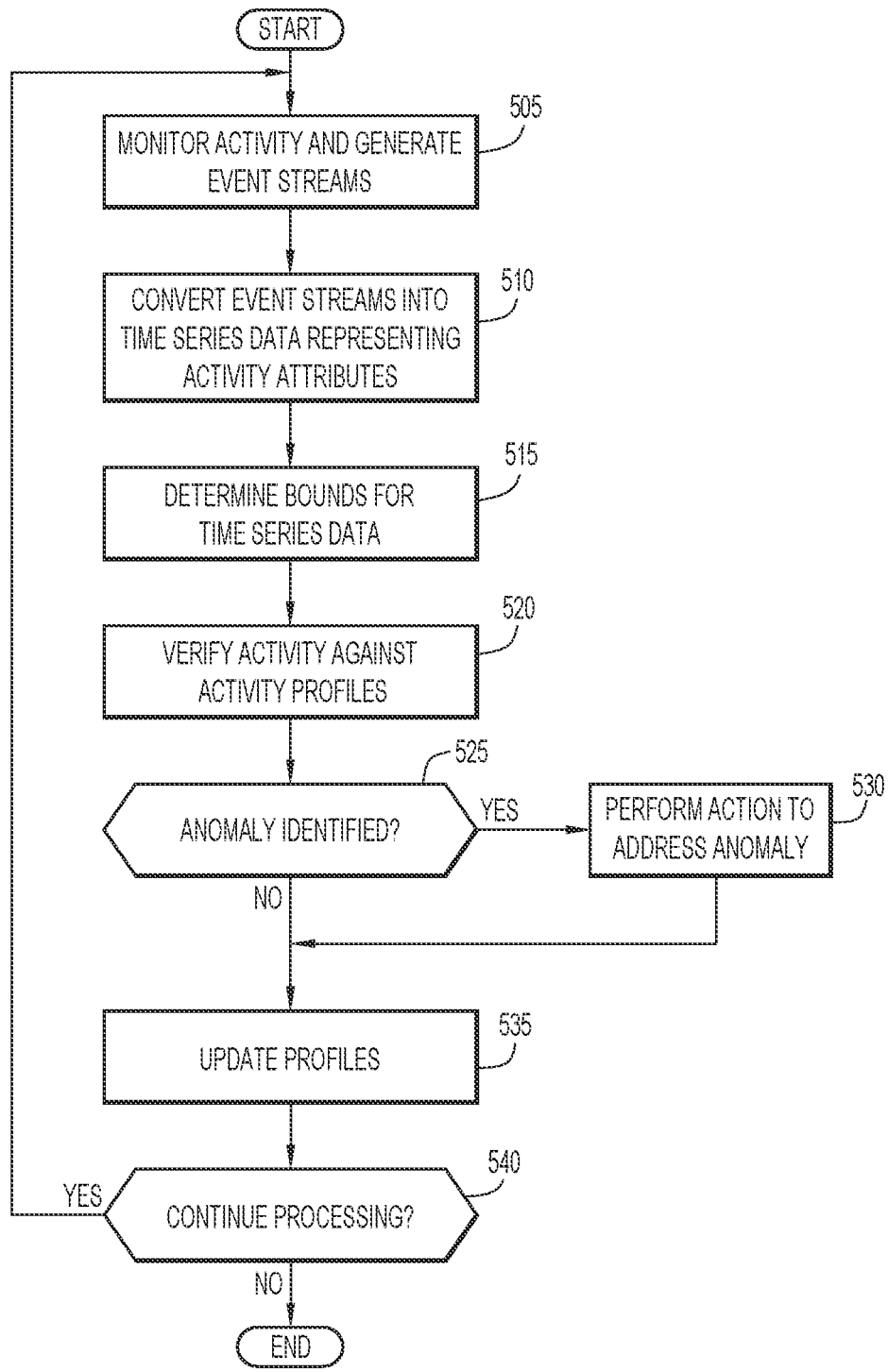
FIG. 5 is procedural flowchart illustrating a manner of detecting abnormal activity on a database or other processing device based on determining bounds of streaming activity data according to an embodiment of the present invention.

A manner of detecting abnormal activity on a database or other processing device based on approximating bounds of time series data containing activity information (e.g., via stream processing module 116 and security module 120 of a server system 110) according to an embodiment of the present invention is illustrated in FIG. 5. By way of example, a present invention embodiment is described with respect to detecting abnormal activity on database server systems. However, the present invention embodiment may be applied to other processing devices (e.g., application or other servers, end-user/client systems, etc.) to detect abnormal activity on the other processing devices in substantially the same manner described below.

Initially, a database server system 130 (FIG. 1) may receive various requests from client systems 114 to access data from database system 145. The database server system processes the requests to retrieve the requested data from database system 145. Collection agent 140 of the database server system monitors activity and generates one or more event streams in real-time at operation 505. Each event stream may include time series values indicating occurrence of a corresponding event and an associated time (e.g., a timestamp, etc.). The corresponding event may be associated with an attribute of the monitored activity. For example, the event streams may indicate an attribute of a frequency of occurrence of the corresponding events over time which can be used as patterns to detect normal and abnormal behavior.

By way of example, an event stream may be associated with a structured query language (SQL) command, and provide values indicating occurrence of the SQL command and a corresponding time (e.g., a timestamp, etc.). For example, the event stream may include a binary stream with binary values indicating occurrence (e.g., a binary value of one) or non-occurrence (e.g., a binary value of zero) of the SQL command at a corresponding time interval (e.g., every second, etc.). Thus, an example binary stream of 1, 0, 1, 0 (pertaining to respective timestamps t0, t1, t2, and t3) indicates occurrence of a corresponding event (e.g., SQL command or verb, etc.) at times t0 and t2. However, an event stream may include any values and be associated with any quantity of any types of events (or attributes) for any time intervals (e.g., use of specific SQL or other commands (e.g., verbs, etc.), Internet Protocol (IP) addresses, applications, database tables accessed, databases accessed, hours of the day of access, etc.). Further, an event stream may be associated with a specific entity (e.g., user, application, machine or device, component, etc.) to monitor behavior of that entity.

The generated event streams are received by stream processing module 116 of a server system 110 at operation 510. The stream processing module may convert the event streams to time series data representing attributes to define behavior. By way of example, the time series data for an event stream may represent activity load (or density) approximations or estimates. The conversion may be accomplished by any conventional or other techniques. For example, an event stream with binary event occurrence data and corresponding timestamps may be applied to Equation 1 above to produce a mean of the time series event stream data representing activity load (or density) for the corresponding event. However, the event stream data may be converted to time series data representing any desired activity or behavior attribute.

Figure 6:
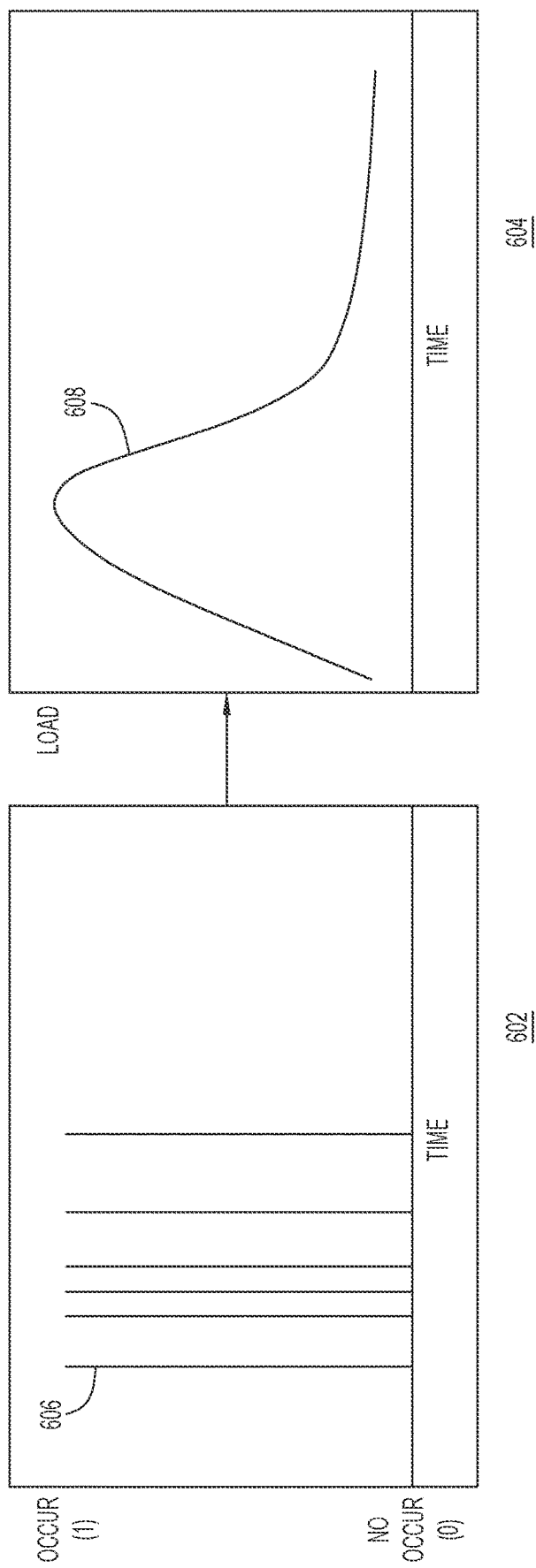
FIG. 6 is a graphical illustration of converting an event data stream to time series data for detecting abnormal activity on a database or other processing device according to an embodiment of the present invention.

Referring to FIG. 6, a graph 602 illustrates example binary event stream data plotted along axes of time and data values. The event stream data may be captured at particular time intervals (e.g., each second, minute, etc.), where a binary value of one indicates occurrence of an event for a corresponding time interval, and a binary value of zero indicates a non-occurrence of the event for the corresponding time interval. By way of example, events 606 have been detected for the corresponding time intervals (e.g., as viewed in FIG. 6). The event stream data may be applied to a smoothing function (e.g., Equation 1) to produce time series data 608 (or a mean of the event stream data representing approximations of activity load or density over time for the corresponding event) as shown in graph 604. In this case of a binary stream, the conversion produces continuous time series data over time. The time series data basically indicate periods of frequent occurrence of the corresponding event and, hence, periods of increased activity load (or density) which may be used to define behavior for an entity (e.g., user, application, machine or device, component, etc.).

Alternatively, the event stream data may contain time series data of an activity or behavior attribute that may be used without conversion or smoothing for defining behavior, or the collection agent may convert the event stream data to time series data representing any activity or behavior attribute as described above.

Referring back to FIG. 5, stream processing module 116 processes the time series data for the corresponding event streams to determine the bounds (e.g., upper and/or lower bounds, etc.) of that data for each of the corresponding event streams at operation 515. By way of example, determination of an upper bound is described. However, other bounds (e.g., lower bound, etc.) may be determined in substantially the same manner described below.

Initially, exponential smoothing and an exponential generalized mean are employed to maintain an upper bound of time series data. This combination minimizes storage needed (which also minimizes run time for updating training data for a statistical model and performing real-time analysis), and gives greater weight to recent values (or recently occurring events) while older values (or older occurring events) are gradually forgotten. The exponential generalized mean, GM( ) may be expressed as:

$$GM(x_1, \ldots, x_n) = \sqrt[p]{\frac{1}{n}\sum_{i=1}^{n} x_i^p};\qquad \text{Equation 4}$$

where x is a data point in time series data, n is a quantity of time intervals or data items being analyzed, i is the current data item, and p is an exponential.

Greater values of the exponent, p, provide greater weight to higher values in time series data to enable these higher values to have greater influence on the resulting mean. As the value of the exponent, p, increases, the higher values become more substantial in the function result. In other words, the resulting mean gravitates toward the higher values with increasing values of the exponent p. For example, an exponent value of one (p=1) produces an actual mean of time series data (since a value with an exponent of one is the same as the value). However, an exponent value of ten (p=10) produces a mean toward the higher values of time series data.

In order to determine the upper bound of time series data, an exponential smoothing function, F(n), may be expressed as:

$$F(n)=(1-\alpha)*F(n-1)+\alpha*D(n);\qquad \text{Equation 5}$$

where a is a smoothing factor (e.g., 0<α<1), n is a current time, and D(n) is time series data (e.g., activity load (or density) data for an event stream produced from the conversion at operation 510).

A weighted exponential generalized mean with a high exponent is applied between the history portion and the current value portion of the exponential smoothing. For example, the history portion and current portion of the exponential smoothing are each raised to the power of an exponent p, and the $p^{th}$ root of the sum of the exponential history and current portions weighted by the smoothing factor is determined to produce the upper bound. This provides a smoothing average on time series data with a higher weight for higher values (according to the exponent p). In this manner, a resulting function, M(n), provides an estimation for the upper bound of time series data, but the influence of older values (or older event occurrences) decays over time. This estimation is provided with very low computational effort and with no additional storage required (except for the previous value of the function). Accordingly, a present invention embodiment determines the bound as the data is streamed in real-time.

An example expression for the resulting function, M(n), providing or approximating the upper bound of time series data may be:

$$M(n)=\sqrt[p]{(1-\alpha)*M(n-1)^p+\alpha*F(n)^p};\qquad \text{Equation 6}$$

where a is a smoothing factor (e.g., 0<α<1), n is a current time, F(n) is the exponential smoothing function on time series data (e.g., from Equation 5), and p is an exponent. However, the resulting function may be expressed in various manners to apply the weighted exponential generalized mean between the history portion and the current value portion of the exponential smoothing.

The smoothing factor, a, for the upper bound (M(n)) and exponential smoothing (F(n)) functions may be determined and tuned or adjusted based on various parameters. For example, the smoothing factor may be determined and tuned or adjusted to produce a desired half-life for values (e.g., time for the value to be reduced by half, etc.). Similarly, the exponent, p, for the upper bound (M(n)) function may be determined and tuned or adjusted based on various parameters (e.g., a range of resulting values to values of the time series data, may be reduced by a decrement over time, etc.). By way of example, the exponent, p, may be in the range of 7-10, and is typically greater than or equal to 2. By way of further example, the smoothing factor, a, for the upper bound (M(n)) and exponential smoothing (F(n)) functions represents a weight of a single event versus a history for the event, and usually has a very small value depending on the time span to remember. Generally, this value is less than 0.1.

A lower bound for time series data may be determined in substantially the same manner described above for the upper bound using various techniques. For example, since time series data representing activity load (or density) resides between 0 and 1, this time series data may be inverted (e.g., for a time series value v, the inverted time series value is 1−v). The lower bound may be determined by inverting the upper bound produced by M(n) for the inverted time series data (e.g., 1—upper bound).

Due to the low computational and storage costs, time series data or a stream may be divided or partitioned into sub-streams, and deeper hierarchical descriptions of the value bounds may be maintained, thereby achieving a richer representation of normal behavior. In other words, the bounds may be determined for the sub-streams representing finer granularity (or additional characteristics) in order to represent normal behaviors based on the finer characteristics. For example, a stream may represent occurrence of a command regardless of command parameters. The stream may be partitioned into sub-streams each corresponding to occurrence of the command with a different set of parameters. The bounds of the sub-streams may be approximated to further define behavior based on use of the command as well as the particular parameters used.

Once the bounds of the time series data (e.g., representing activity load (or density), etc.) are determined for corresponding event streams, security module 120 evaluates the bounds for the various event streams against profiles of entities associated with the activity (e.g., user, application, machine or device, component, etc.) indicating valid or normal corresponding behaviors at operation 520. For example, entity accesses may be monitored over a time window and event streams (or time series data) indicating occurrence of corresponding events may be produced based on activities. The events may correspond to various events as described above (e.g., use of specific SQL or other commands (e.g., verbs, etc.), Internet Protocol (IP) addresses, applications, database tables accessed, databases accessed, hours of the day of access, etc.). The bounds for each event stream may be determined as described above and used to form a profile for an entity (e.g., user, application, machine or device, component, etc.). For example, the profile may include bounds for various events (e.g., use of specific SQL or other commands (e.g., verbs, etc.), Internet Protocol (IP) addresses, applications, database tables accessed, databases accessed, hours of the day of access, etc.). The approximated bounds of monitored activity data may be compared to bounds of events within a profile for a corresponding entity to determine the presence of security anomalies (e.g., when approximated bounds of the monitored activity are outside the bounds of the profile, etc.).

When an anomaly is identified as determined at operation 525, security module 120 initiates or performs an appropriate action at operation 530. For example, notifications may be sent to organizations or users (e.g., administrators of database 145, etc.) indicating a potential security issue (e.g., monitored activity does not correspond to normal behavior, etc.). Further, controls may be generated and applied to deny and/or terminate access for the entity (e.g., user, application, machine or device, component, etc.) corresponding to the abnormal behavior. In addition, collection agent 140 may be configured or directed to capture other events and generate event streams pertaining to the anomaly for a closer examination. For example, the collection agent may be configured to capture events based on a larger set of characteristics to analyze data streams with details pertaining to the anomaly. Thus, the behavior may be monitored, and abnormal behavior detected, in real-time to address security issues.

When anomalies are absent as determined at operation 525, security module 120 may update profiles of one or more entities associated with the monitored activity based on the approximated bounds at operation 535. For example, bounds in a profile for corresponding events may be updated by the approximated bounds (e.g., replaced, averaged, etc.) based on various conditions (e.g., a difference between an approximated bound and a corresponding profile bound exceeds a threshold, etc.). Further, the time series data or streams may be divided or partitioned into sub-streams, and deeper hierarchical descriptions of the value bounds may be maintained, thereby achieving a richer representation of normal behavior as described above. The profiles may be updated with these additional bounds. Thus, the profiles of entities may be dynamically updated over time to adapt to and/or further define valid or normal behaviors.

Since some behaviors change over time (e.g., a user switches roles in an organization, etc.), an anomaly may become a new normal or valid behavior for which actions are no longer needed. Accordingly, security module 120 may update profiles of one or more entities associated with the monitored activity (e.g., as described above) at operation 535 after performing the appropriate action at operation 530. Since the profiles are typically updated gradually, a behavior may be observed plural times before being considered a new normal or valid behavior (e.g., the bounds in a profile are gradually updated until the approximated bounds for the monitored activity corresponding to the new behavior satisfies the profile bounds, etc.).

After profiles have been updated in the manner described above at operation 535, the process returns to operation 505 to monitor activity until processing terminates as determined at operation 540.

It will be appreciated that the embodiments described above and illustrated in the drawings represent only a few of the many ways of implementing embodiments for detecting abnormal database activity (e.g., based on approximating bounds for time series activity data in a data stream real-time environment).

The environment of the present invention embodiments may include any number of computer or other processing systems (e.g., client or end-user systems, server systems, database servers or other processing devices, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., commercially available or custom browser software; commercially available or custom communications software; commercially available or custom server software; stream processing module 116, security module 120, interface module 122, and collection agent 140 of present invention embodiments; etc.). These systems may include any types of monitors and input devices (e.g., keyboard, mouse, voice recognition, etc.) to enter and/or view information.

It is to be understood that the software of the present invention embodiments (e.g., stream processing module 116, security module 120, interface module 122, collection agent 140, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., stream processing module 116, security module 120, interface module 122, collection agent 140, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., entity profiles, approximated bounds, collected data, streaming data, smoothed data, etc.). The database systems may be implemented by any number of any conventional or other databases, data stores or storage structures (e.g., files, databases, data structures, data or other repositories, etc.) to store information. The database systems may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., security notifications, abnormal activity, retrieved data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., security notifications, abnormal activity, retrieved data, etc.).

The present invention embodiments are not limited to the specific tasks or algorithms described above, but may be utilized for detecting abnormal activity on any processing device based on determining or approximating bounds for streaming or time series activity data. The event stream may include any values and be associated with any quantity of any types of events for any time intervals (e.g., use of specific SQL or other commands (e.g., verbs, etc.), Internet Protocol (IP) addresses, applications, database tables accessed, databases accessed, hours of the day of access, etc.). The timestamps may include any indicator of any time, while the event stream may include data indicating any state or other attribute of an event or component of the processing device.

The event stream may be processed in any manner to determine or produce data for a behavior or activity attribute (e.g., weighted or smoothed mean, etc.). Alternatively, the collection agent may capture data for the behavior or activity attribute. The data for the activity attribute may span in any degree suitable for analysis (e.g., continuous over time, any suitable time intervals between data points for the analysis, etc.). The bounds may be approximated based on various combinations of a weighted or exponential mean and exponential smoothing. The smoothing factor of the bound approximation may be set to any desired values within any value ranges to distribute weight to recent and older data. The smoothing factor of the bound approximation may be selected and/or tuned based on any desired factors (e.g., time, half-life, etc.). The exponent of the bound approximation may set to any desired values within any value ranges to distribute weight to greater and lesser values. The exponent of the bound approximation may be selected and/or tuned based on any desired factors (e.g., a range of resulting values to values of the time series data, may be reduced by a decrement over time, etc.).

A profile may be associated with any entity (e.g., user, application, machine or device, component, etc.) to indicate valid behavior or activity. The profile may contain any quantity of any information (e.g., activity attributes or characteristics, etc.) to define valid behavior or activity (e.g., upper and/or lower bounds of any activity attributes or characteristics, etc.). The profile may be generated by monitoring entity activity for any desired time interval (e.g., hour, day, etc.) and approximating the bounds (e.g., using the techniques described above, etc.). The profile may be updated in any fashion (e.g., replaced, averaged, etc.) based on any conditions (e.g., a difference between an approximated bound and a corresponding profile bound exceeds a threshold, periodically or after a desired time interval, etc.).

Abnormal behavior may be detected by comparing monitored activity bounds to corresponding profile bounds in any fashion. For example, any quantity (e.g., one or more) of monitored activity bounds may be beyond corresponding profile bounds (e.g., above an upper bound, below a lower bound, etc.), or be beyond by a threshold amount, in order to indicate abnormal behavior. For example, the threshold amount may be a constant multiplied by the standard deviation of the time series data for a monitored activity (e.g., the approximated bound for the monitored activity is greater than 2*the standard deviation over the profile bound, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of detecting abnormal activity on a processing device comprising:
   receiving, via a processor, time series data including information pertaining to a corresponding attribute of monitored activity on the processing device;
   determining, via the processor, an upper bound of the time series data based on a weighted combination of a prior upper bound and a current value derived from the time series data, wherein greater weight is provided to greater values in the time series data based on an exponent applied to the prior upper bound and the current value and an effect of older values in the time series data decays over time based on a smoothing factor applied to exponential values of the prior upper bound and the current value that are derived from applying the exponent;
   applying, via the processor, the upper bound to a profile of an entity associated with the monitored activity, wherein the profile includes bounds for attributes of activities of the entity indicating valid behavior and the upper bound is compared to a corresponding bound of the profile; and
   detecting, via the processor, abnormal activity on the processing device based on the comparison of the upper bound to the corresponding bound of the profile.

2. The method of claim 1, wherein the processing device is a database system.

3. The method of claim 2, wherein the upper bound is determined based on a root of a weighted combination of exponential values of the prior upper bound and a current weighted mean of the time series data that are derived from applying the exponent, wherein the root corresponds to the exponent.

4. The method of claim 2, further comprising:
   inverting, via the processor, the time series data to produce inverted data;
   determining, via the processor, the upper bound of the inverted data; and
   inverting, via the processor, the upper bound of the inverted data to produce a lower bound of the time series data.

5. The method of claim 2, further comprising:
   dividing, via the processor, the time series data into sub-streams each corresponding to additional characteristics of the corresponding attribute;
   determining, via the processor, the upper bound for the sub-streams; and
   updating, via the processor, the profile of the entity with the upper bound of the sub-streams to refine the valid behavior for the entity.

6. The method of claim 2, wherein receiving the time series data further comprises:
   receiving, via the processor, an event stream indicating occurrence of events on the processing device; and
   converting, via the processor, the event stream to the time series data representing an activity load on the processing device.

7. A system for detecting abnormal activity on a processing device comprising:
   at least one processor configured to:
      receive time series data including information pertaining to a corresponding attribute of monitored activity on the processing device;
      determine an upper bound of the time series data based on a weighted combination of a prior upper bound and a current value derived from the time series data, wherein greater weight is provided to greater values in the time series data based on an exponent applied to the prior upper bound and the current value and an effect of older values in the time series data decays over time based on a smoothing factor applied to exponential values of the prior upper bound and the current value that are derived from applying the exponent;
      apply the upper bound to a profile of an entity associated with the monitored activity, wherein the profile includes bounds for attributes of activities of the entity indicating valid behavior and the upper bound is compared to a corresponding bound of the profile; and
      detect abnormal activity on the processing device based on the comparison of the upper bound to the corresponding bound of the profile.

8. The system of claim 7, wherein the processing device is a database system.

9. The system of claim 8, wherein the upper bound is determined based on a root of a weighted combination of exponential values of the prior upper bound and a current weighted mean of the time series data that are derived from applying the exponent, wherein the root corresponds to the exponent.

10. The system of claim 8, wherein the at least one processor is further configured to:
   invert the time series data to produce inverted data;
   determine the upper bound of the inverted data; and
   invert the upper bound of the inverted data to produce a lower bound of the time series data.

11. The system of claim 8, wherein the at least one processor is further configured to:
   divide the time series data into sub-streams each corresponding to additional characteristics of the corresponding attribute;
   determine the upper bound for the sub-streams; and
   update the profile of the entity with the upper bound of the sub-streams to refine the valid behavior for the entity.

12. The system of claim 8, wherein receiving the time series data further comprises:
   receiving an event stream indicating occurrence of events on the processing device; and
   converting the event stream to the time series data representing an activity load on the processing device.

13. A computer program product for detecting abnormal activity on a processing device, the computer program product comprising one or more computer readable storage media having program instructions collectively stored on the one or more computer readable storage media, the program instructions executable by a processor to cause the processor to:
  receive time series data including information pertaining to a corresponding attribute of monitored activity on the processing device;
  determine an upper bound of the time series data based on a weighted combination of a prior upper bound and a current value derived from the time series data, wherein greater weight is provided to greater values in the time series data based on an exponent applied to the prior upper bound and the current value and an effect of older values in the time series data decays over time based on a smoothing factor applied to exponential values of the prior upper bound and the current value that are derived from applying the exponent;
  apply the upper bound to a profile of an entity associated with the monitored activity, wherein the profile includes bounds for attributes of activities of the entity indicating valid behavior and the upper bound is compared to a corresponding bound of the profile; and
  detect abnormal activity on the processing device based on the comparison of the upper bound to the corresponding bound of the profile.

14. The computer program product of claim 13, wherein the processing device is a database system.

15. The computer program product of claim 14, wherein the upper bound is determined based on a root of a weighted combination of exponential values of the prior upper bound and a current weighted mean of the time series data that are derived from applying the exponent, wherein the root corresponds to the exponent.

16. The computer program product of claim 14, wherein the program instructions further cause the processor to:
  invert the time series data to produce inverted data;
  determine the upper bound of the inverted data; and
  invert the upper bound of the inverted data to produce a lower bound of the time series data.

17. The computer program product of claim 14, wherein the program instructions further cause the processor to:
  divide the time series data into sub-streams each corresponding to additional characteristics of the corresponding attribute;
  determine the upper bound for the sub-streams; and
  update the profile of the entity with the upper bound of the sub-streams to refine the valid behavior for the entity.

18. The computer program product of claim 14, wherein receiving the time series data further comprises:
  receiving an event stream indicating occurrence of events on the processing device; and
  converting the event stream to the time series data representing an activity load on the processing device.

* * * * *